United States Patent [19]

Mitsuyama

[11] Patent Number: 4,971,195
[45] Date of Patent: Nov. 20, 1990

[54] DISC CASE

[76] Inventor: Mashuhiro Mitsuyama, 1520 Hikasashimo, Wake-cho, Wake-gun, Okayama-ken, Japan

[21] Appl. No.: 382,939

[22] Filed: Jul. 21, 1989

[30] Foreign Application Priority Data

Sep. 24, 1988 [JP] Japan .................. 63-124936[U]

[51] Int. Cl.$^5$ ............................................. B65D 85/57
[52] U.S. Cl. .................................. 206/311; 206/313; 206/444; 229/84
[58] Field of Search .............. 206/303, 311, 312, 313, 206/309, 444; 229/84, 77

[56] References Cited

U.S. PATENT DOCUMENTS

| | | | |
|---|---|---|---|
| 2,437,934 | 3/1948 | Brink | 229/84 |
| 3,688,898 | 9/1972 | Stanton | 206/311 |
| 3,722,564 | 3/1973 | Croon | 206/311 |
| 4,042,106 | 8/1977 | Smith | 206/313 |
| 4,327,831 | 5/1982 | Inaba et al. | 206/444 X |
| 4,473,153 | 9/1984 | Colangelo | 206/444 X |
| 4,488,645 | 12/1984 | Yamaguchi | 206/444 |
| 4,640,413 | 2/1987 | Kaplan et al. | 206/444 X |
| 4,653,639 | 3/1987 | Traynor | 206/444 |
| 4,655,388 | 4/1987 | Fleming | 229/84 X |
| 4,762,225 | 8/1988 | Henkel | 206/444 X |

*Primary Examiner*—Paul T. Sewell
*Assistant Examiner*—Jacob K. Ackun, Jr.
*Attorney, Agent, or Firm*—Armstrong, Nikaido, Marmelstein, Kubovcik & Murray

[57] ABSTRACT

A disk case comprised of a rectangular outer case member being opened at its upper side and made from soft synthetic resin sheet and an inner case member made from soft material selected from non-woven fabric, cloth, paper or synthetic resin sheet to receive a data disc, which is fitted in the outer case member. In order to prevent a received disc from slipping out, one side of the inner case member is fastened to the outer case member forming a space for receiving the words card or words note between the outer case member and inner case member and a stopper formed in the upper end of the outer case member to prevent the disc from slipping out. In order to make the taking in or out of the words card or words note smoothly, the outer case member further provides a cut-off portion at one longitudinal side, thereby allowing a words card or words note to pass therethrough.

9 Claims, 6 Drawing Sheets

DISC CASE

BACKGROUND OF THE INVENTION

1. Field of the Invention

The present invention relates to a disc case to hold a data disc as well as a words-card or a words-note.

2. Related Art

There have been known a conventional disc case which consists of an outer case member made from soft synthetic resin and having an opening at its upper end, and an inner case member which is fitted in the outer case member. The inner case member is made from soft material such as non-woven fabric, paper, cloth or the like in order to protect a disc to receive therein from scatch or dint. In such disc case, a words-card or words-note is received and held in a space formed between the outer case member and inner case member, and data disc is received and held in the inner case member.

However, such conventional disc case has disadvantageous problems as follows:

(1) There have been accidents which the disc slips out of the inner case member and gets scratches or dints on its surface unexpectedly when the opening of the case is made downward, because such conventional case has no stopper;

(2) The inner case member is often pulled out of the outer case member together with a words-note on taking out the words-note, since the inner case member is only inserted into the outer case member and not be fastened;

(3) Taking in and out of a words-card or words-note cannot be performed smoothly, because the words card or words note often gets its edges caught at the opening edge of the case. Especially in case of words note, there have been often accidents in which words note is broken at the cover sheet or the pages.

SUMMARY OF THE INVENTION

In view of the above, one object of the present invention is to provide a disc case for a data disc such as so called compact disc, laser disc et al which is capable of preventing such accidents in which a disc slips out of the inner case member and gets scratches or dints on its surface unexpectedly even when the opening of the case is made downward.

Another object of the invention is to provide a disc case which is suitable to take in or take out the disc smoothly without the inner case member being pulled out from outer case member.

Further object of the invention is to provide a disc case which is suitable to take in and out a words card or words note without getting its edges caught at the opening edge of the inner case member.

To attain the above first and second objects, according to the present invention a disc case comprises a rectangular outer case member being opened at its upper side and made from soft synthetic resin sheet, an inner case member made from soft material selected from non-woven fabric, cloth, paper or synthetic resin sheet to receive a data disc, which is fitted in the outer case member and its one side is fastened to the outer case member, a space for receiving a words card or words note formed between the outer case member and inner case member, and a stopper formed in the upper end of the outer case member to prevent the disc from slipping out.

According to the disc case of the present invention, the stopper prevents the received data disc from slipping out of the case even when the opening of the case is made downward, and one side of the inner case member is fastened to the outer case member to make it smooth to take in and out the received data disc while preventing the inner case member from sliding in the outer case and from being pulled out together with the disc.

To attain the third object, according to the present invention the outer case member further comprises a cut-off portion at one longitudinal side, thereby allowing a words card or words note to enter therethrough.

Such a cut-off portion enables the operation of taking in and out of the words card or words note smoothly, since the cut-off portion renders the opening wider than conventional ones.

Other objects and advantages of the present invention will be understood from the following description of disc case according to preferred embodiment of the present invention.

PREFERRED EMBODIMENT

Figure 1:
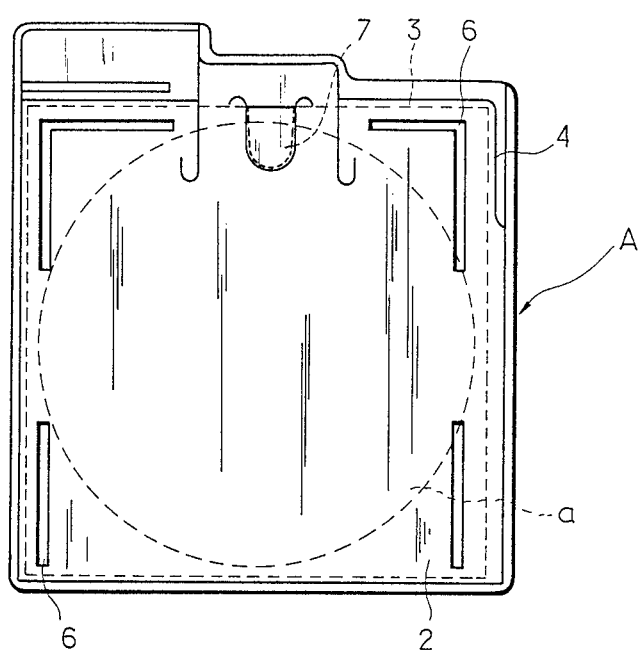
FIG. 1 is a front elevational view of a disc case of the first embodiment of the present invention received a disc as well as words note therein.
Figure 2:
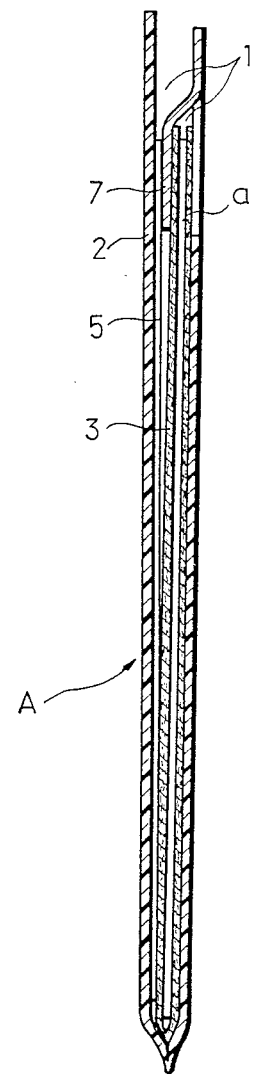
FIG. 2 is an enlarged longitudinally sectional view thereof.
Figure 3:
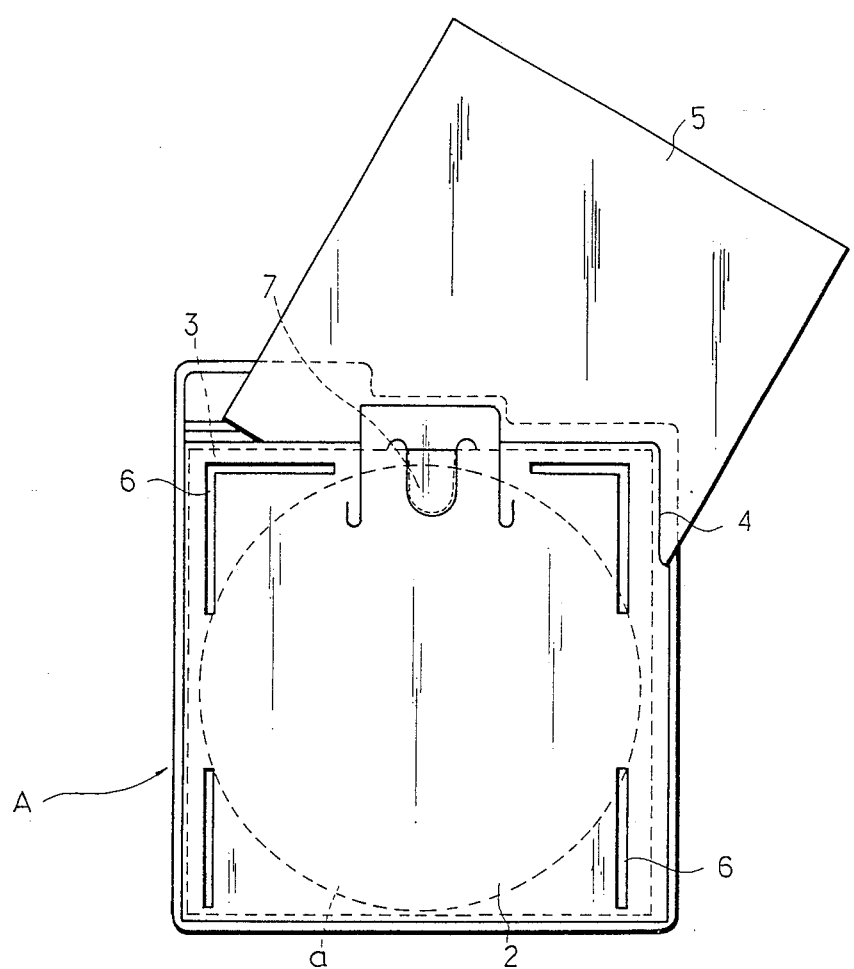
FIG. 3 is a front view illustrating a words note being taken in and out.

In FIGS. 1 to 3, there is illustrated the first preferred embodiment of a disk case according to the present invention. The disc case A comprises a rectangular outer case member 2 and an inner case member 3 and has an opening 1 at its upper side. The outer case 2 member is made from two rectangular soft synthetic resin sheets by sealing the circumference overlapped each other excluding the upper side by means of ultrasonic welding. And the inner case member 3 is made from soft material such as non-woven fabric, cloth, paper or synthetic resin sheet not to injur the surface of a disc to receive therein from scratch or dint.

The inner case member 3 is to receive a data disc and fitted in the outer case member 2 with its one side fastened to the outer case member by ultra-sonic welding at numeral 6 in the corners. There is formed a space to receive a words card or words note between the other outside of the inner case member and the opposite inside of the outer case member.

The outer case member 2 is somewhat longer upwardly than the inner case member 3, and there is provided a stopper strip 7 by cutting the projecting upper portion of the outer case member. The stopper strip 7 is formed in U-shape to enable to extend over the upper periphery of the inner case member 3 and to insert its free end into the space between the inner case member and the outer case member, thereby preventing a data disc "a" received in the inner case member from slipping out therefrom even when the disc case A is turned upside down.

A short cut-off portion 4 is formed at the upper end of right longitudinal side of the outer case member 2 by cutting off the sealed side periphery to allow a words card or a words note passing therethrough. This cut-off portion 4 makes the opening 1 essentially wider on taking in and out the words card or words note 3 so that the operation of taking in and out is made smooth. Words card or words note 5 is entered smoothly by inserting initially placing its end portion on the shoulder of the cut-off portion 4 at a certain angle as shown in FIG. 3 and then advancing deeply with rotating it toward elevational direction until it is placed and held in the space between the outer case member 2 and inner case member 3. Taking out of the words note may be conducted in the contrary way of the above.

Figure 4:
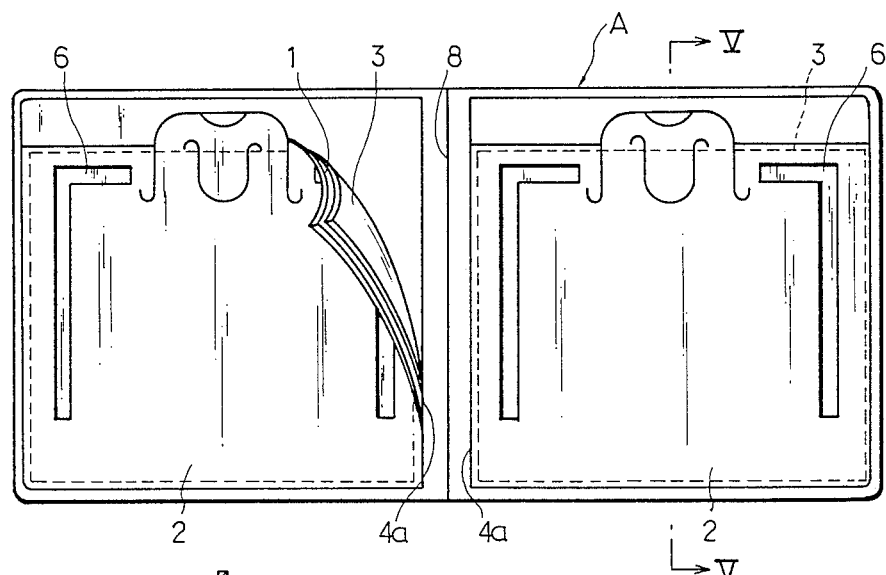
FIG. 4 is a front view of another mode of the first embodiment.
Figure 5:
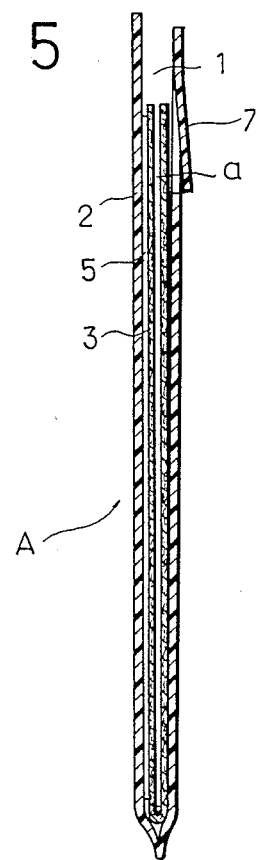
FIG. 5 is an enlarged sectional view taken along the line V—V in FIG. 4.

FIGS. 4 and 5 show an another mode of the above first embodiment, in which the disc case A consists two cases arranged laterally in a row and foldably connected at a folding line 8. Each disc case is substantially same as the disc case above described other than the element of the cut-off portion. A long cut-off portion 4a is provided at the longitudinal side at the central side of the hinge line 7. The cut-off portion 4a extend from upper end of the longitudinal side to the bottom remaining no sealed portion in its side. Such long cut-off portion 4a makes the opening 1 wide enough to take in and out the words card or words note 3. In the closed position of this mode, words card or words note is prevented from slipping out by the folded central portion. And user may take in and out the words card or words note so easily through the long cut-off portion 4a in the opened position.

Figure 6:
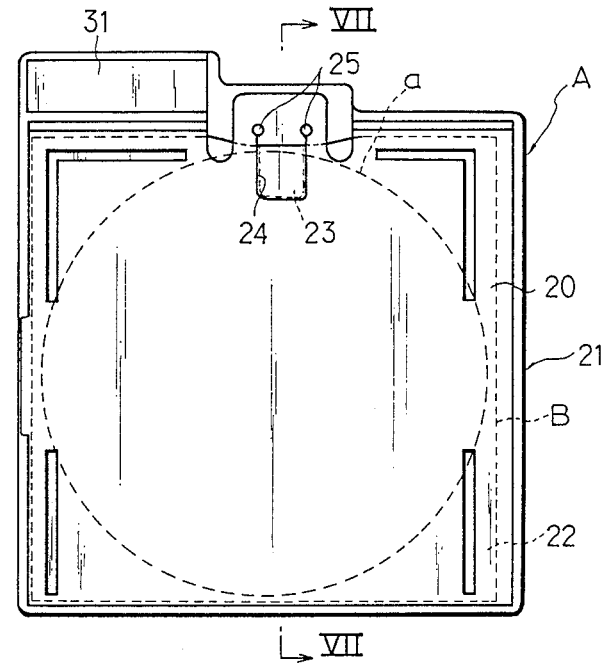
FIG. 6 is a front view of the second embodiment of the present invention received a disc as well as words note therein.
Figure 7:
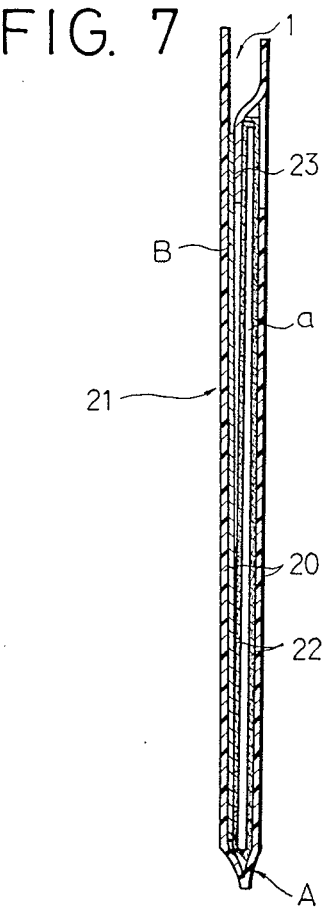
FIG. 7 is an enlarged sectional view taken along the line VII—VII in FIG. 6.

FIGS. 6 and 7 show another embodiment according to the present invention. In this embodiment, the disc case is substantially same as the first embodiment above described other than the element in which this has not such a cut-off portion 4 in the first embodiment above described. In figures numeral 20 designates outer case member; 22 is inner case member; 23 is stopper strip; 24 is cut line; 25 is small aperture which is formed at the top end of the cut line 24 to prevent burst; 31 is an index column pocket to insert a index card of music title et al, in which the surface is made from transparent film; and B is words card.

Figure 9:
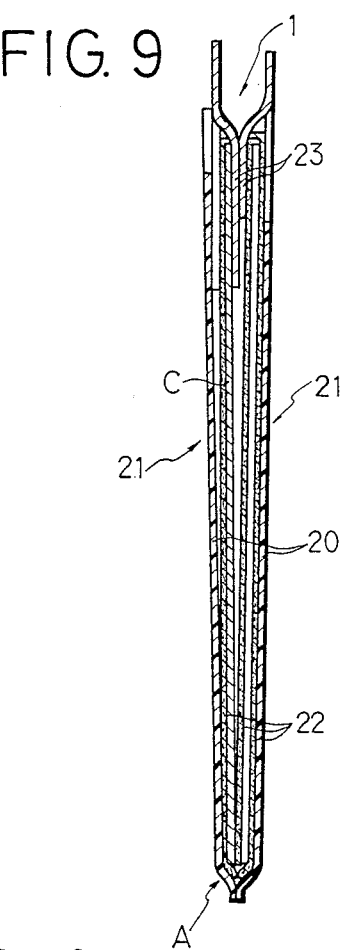
FIG. 9 is a longitudinally sectional view thereof.
Figure 8:
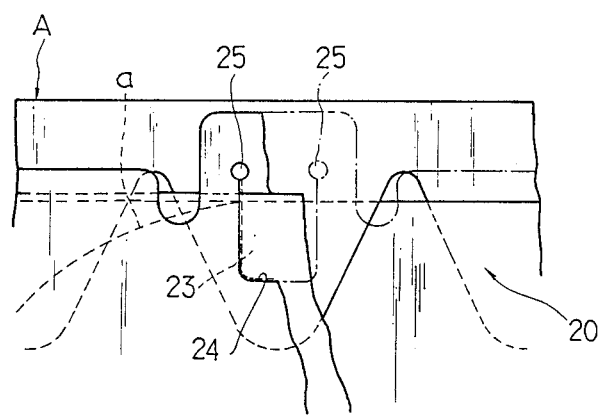
FIG. 8 shows another mode in its stopper of the second embodiment of the present invention.

FIGS. 8 and 9 show another mode in its stopper and inner case member of the second embodiment. In this mode, inner case member 22 consists of three sheets of unwoven fabric to provide two pockets. One is for receipt of a disc "a" and cardboard C, and the other is for receipt of words card or words note.

Further, there are provided two stopper strips 23, 23 at each of the opposite upper central portion of the outer case member respectively. One stopper strip is used for a data disc "a" and cardboard C, and the other is used for words card or words note to prevent from dropping down or slipping out from the case respectively.

Figure 10:
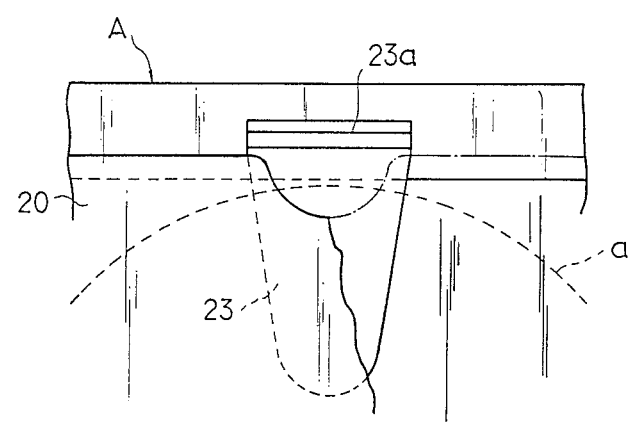
FIG. 10 is further another mode in its stopper of the third embodiment of the present invention.
Figure 11:
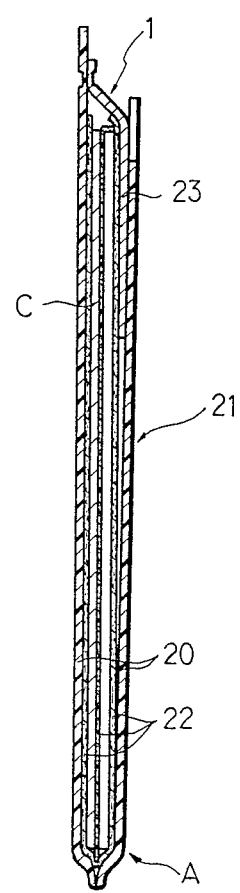
FIG. 11 is a longitudinally sectional view thereof.
Figure 12:
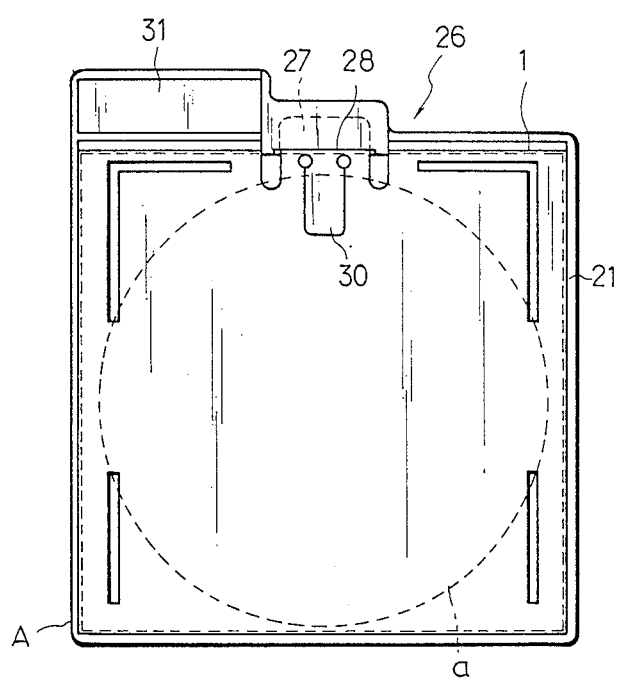
FIG. 12 is a front elevational view of the third embodiment of the invention received a disc as well as words note therein.
Figure 13:
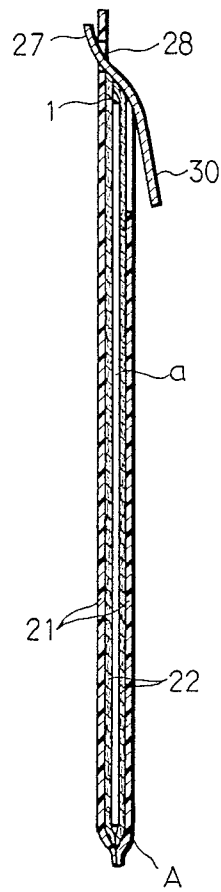
FIG. 13 is a longitudinal sectional view thereof.

FIGS. 10 and 11 show further mode in its stopper of the second embodiment. In this mode, there is provided a stopper strip 23 fastened another independent strip of synthetic resin to the outer case member 20 at its upper central portion 23a by means of heat welding or ultrasonic welding.

FIGS. 12 to 15 show third embodiment of present invention, which is essentially same as the second embodiment above described other than the element in its stopper mechanism. In figures numeral 21 designates outer case member made from soft synthetic resin sheet; 22 is inner case member made from unwoven fabric; 31 is an index column pocket to insert a index card of music title et al; and 26 shows stopper mechanism of this mode.

The stopper mechanism 26 of this mode consists of an engaging strip 27 which formed at upper central end of the front side outer case member 21 and a slit 28 to insert the engaging strip 27 therethrough, thereby preventing the received disc "a" from slipping out. A releasing strip 30 is provided just under the engaging strip 27 by cutting in U-shape. This releasing strip 30 might be used to pull out the engaging strip 27 from the slit 28 when the received should be taken out from the case.

Figure 14:
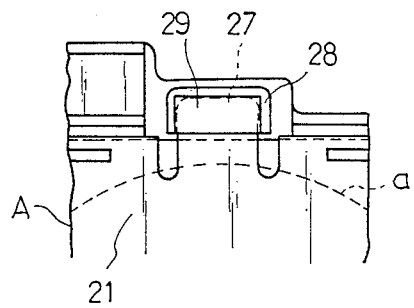
FIG. 14 shows shows another mode in its stopper of the third embodiment of the present invention.

FIG. 14 shows another mode in its stopper mechanism of the third embodiment above described. In this mode, a holding pocket 29 is provided to receive and hold the engaging strip 27 therein substituting for the slit. The holding pocket 29 is formed by fastening a synthetic film piece to the central upper portion of the rear outer case member 21 at its circumference 28 remaining the underside by means of ultrasonic welding.

Figure 15:
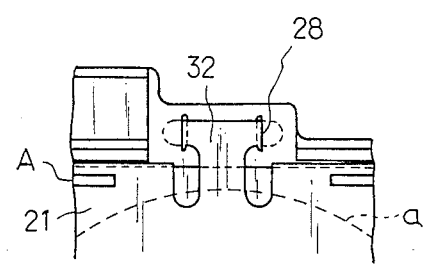
FIG. 15 shows further another mode in its stopper of the third embodiment of the present invention.

FIG. 15 shows further mode in its stopper mechanism of the third embodiment of the present invention. There is provided a T-shaped engaging strip 32 having opposite projecting portion in its free end as shown in the drawing. A pair of longitudinal slits 28 is formed in parallel with each other at the rear side of outer case member 21 opposite to the strip 32. The T-shaped engaging strip 32 enters into the pair of longitudinal slits 28 at its projecting portion. Such strip 32 may be held securely with the slits 28 since the slits are formed in the longitudinal direction.

I claim:

1. A disc case apparatus having at least one disc case, said disc case being adapted for separately storing a data disc or the like and a word card or the like, said disc case comprising:
    a substantially rectangular outer case member having an open upper side and closed vertical sides and two walls and made from a soft synthetic resin sheet, said outer case member being provided with at least one portion cut out from one wall and forming a tongue at a central point of and in the vicinity of said open upper side in a manner such that a part of said outer case member formed by said tongue itself works as a stopper strip; and
    a substantially rectangular inner case member made from soft material selected from the group consisting of non-woven fabric, cloth, paper or synthetic resin sheet and having an open upper side to insert and receive the data disc therein and closed vertical sides, said inner case member being placed within said outer case member so as further to provide a word-card storage space between the inner case member and the outer case member, said inner case member being slightly smaller than said outer case member such that said stopper strip can close the upper side of said inner case member by projecting from said one wall over the open upper side of the inner case member and being disposed between said inner case member and the other wall of said outer case member thereby preventing the data disc from slipping out of said inner case member.

2. A disc case apparatus as claimed in claim 1, wherein said outer case member further comprises a cut-off portion at one of said vertical sides of said rectangular outer case member, said cut-off portion being connected to said upper open side thereof thereby allowing the word card to pass there-through.

3. A disc case apparatus as claimed in claim 2, wherein said cut-off portion is formed at an upper end of the vertical side by sealing a lower portion thereof while leaving a remaining portion unsealed.

4. A disc apparatus as recited in claim 2 in which two outer case members are foldable connected laterally and in series a cut-out portion being provided on each of the outer case members and extending from an upper end of a vertical side of each member at a bottom end and leaving a vertical side of each outer case member unsealed and wherein each of the cup-out portions is provided on an inner vertical side respectively.

5. A disc case apparatus as claimed in claim 1, wherein said stopper strip is formed by a continuous slit having a substantially U-shape.

6. A disc case apparatus as claimed in claim 1, wherein said stopper strip is a projection and further wherein said other wall of the outer case member is provided with a slit to insert said projection therein.

7. A disc case apparatus as claimed in claim 6, wherein said projection has a substantially T-shape.

8. A disc case apparatus as claimed in claim 1, comprising a pair of disc cases joined together, wherein said disc case apparatus is foldable in a manner such that one disc case is placed upon the other disc case.

9. A disc case apparatus as claimed in claim 8, wherein at least one of the disc cases is provided with a cut-out portion at one of the vertical sides of each of said rectangular outer and inner case members.

* * * * *